(12) United States Patent
Kesiraju et al.

(10) Patent No.: US 10,133,571 B1
(45) Date of Patent: Nov. 20, 2018

(54) LOAD-STORE UNIT WITH BANKED QUEUE

(71) Applicant: Apple Inc., Cupertino, CA (US)

(72) Inventors: Aditya Kesiraju, San Jose, CA (US);
Mridul Agarwal, Sunnyvale, CA (US);
Pradeep Kanapathipillai, Santa Clara, CA (US); Sean M. Reynolds, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 253 days.

(21) Appl. No.: 15/171,369

(22) Filed: Jun. 2, 2016

(51) Int. Cl.
*G06F 9/30* (2018.01)
*G06F 9/38* (2018.01)

(52) U.S. Cl.
CPC ........ *G06F 9/30043* (2013.01); *G06F 9/3834* (2013.01)

(58) Field of Classification Search
CPC ... G06F 9/30043; G06F 9/3826; G06F 9/3834
See application file for complete search history.

(56) References Cited

U.S. PATENT DOCUMENTS

| | | | |
|---|---|---|---|
| 6,247,064 B1 | 6/2001 | Alferness et al. | |
| 6,745,277 B1 | 6/2004 | Lee et al. | |
| 6,988,186 B2 | 1/2006 | Eickemeyer et al. | |
| 7,010,654 B2 | 3/2006 | Blackmon et al. | |
| 7,937,559 B1 | 5/2011 | Parameswar et al. | |
| 2014/0215190 A1* | 7/2014 | Mylius | G06F 9/30043 712/220 |

OTHER PUBLICATIONS

Manoj Franklin and Gurindar Sohi, "ARB: A Hardware Mechanism for Dynamic Reordering of Memory References", 1996, IEEE. (Year: 1996).*

* cited by examiner

*Primary Examiner* — Benjamin P Geib
(74) *Attorney, Agent, or Firm* — Meyertons, Hood, Kivlin, Kowert & Goetzel., P.C.; Erik Heter (57) ABSTRACT

A load-store unit having one or more banked queues is disclosed. In one embodiment, a load-store unit includes at least one queue that is subdivided into multiple banks. Although divided into multiple banks, the queue logically appears to software as a single queue. A first bank of the queue includes a first plurality of entries, with the second bank of the queue having a second plurality of entries, wherein each of the entries is arranged to store memory instructions. Each of the banks is associated with corresponding logic circuitry that controls one or more pointers for that bank. The pointer information may be exchanged between the logic circuits associated with the banks. Based on the pointer information that is exchanged, each bank may output (e.g., for retirement) one entry per cycle.

17 Claims, 7 Drawing Sheets

LOAD-STORE UNIT WITH BANKED QUEUE

BACKGROUND

Technical Field

This disclosure is directed to processors, and more particularly, to load-store units in processors.

Description of the Related Art

Processors may be implemented using various architectures. One commonly used architecture is known as the load-store architecture. In a load-store architecture, memory access instructions are divided into two types: loads, in which information is loaded from memory to registers, and stores, in which information is written to memory from registers. Instructions in a load-store architecture may further be divided into memory instructions (i.e. the aforementioned load and store instructions) and arithmetic-logic unit (ALU) instructions, in which operations occur between registers.

A load-store unit is a specialized circuit unit implemented in processors having a load-store architecture. A load-store unit may execute load and store instructions to load information from memory and to store it back thereto. A typical load-store unit includes load and store queues for storing load and store instructions, respectively. The load and store instructions may be executed by the load-store unit, which may operate at least somewhat independently of other hardware units in the processor.

SUMMARY

A load-store unit having one or more banked queues is disclosed. In one embodiment, a load-store unit includes at least one queue that is subdivided into multiple banks. Although divided into multiple banks, the queue logically appears to software as a single queue. A first bank of the queue includes a first plurality of entries, with the second bank of the queue having a second plurality of entries, wherein each of the entries is arranged to store memory instructions. Each of the banks is associated with corresponding logic circuitry that controls one or more pointers for that bank, wherein the pointers are used for maintaining memory ordering. The pointer information may be exchanged between the logic circuits associated with the banks. Based on the pointer information that is exchanged, each bank may select (e.g., for retirement) one entry per cycle.

In one embodiment, the load-store unit includes a banked load queue having at least two banks (embodiments with more than two banks are possible and contemplated). The entries of the multiple banks are interleaved with one another. Logic circuitry associated with a first bank may control pointers for that bank. Similarly, pointers for a second bank may be controlled by logic circuitry associated with that bank. The logic circuitry associated with one bank may exchange pointer information with the logic circuitry associated with each of the other banks. The various pointers may include an eligibility pointer indicative of which entries in the respective bank are eligible for retirement. During each cycle, the logic circuitry associated with each bank may select an entry for retirement that is older than entries indicated by the respective retirement eligibility pointers for each bank. For example, in a two bank embodiment, an entry may be selected for retirement if it is older than the entry indicated by the retirement eligibility pointer for its own bank and the retirement eligibility pointer for the other bank.

Other pointers associated with a load queue may include a dequeue pointer, which may indicate next entry in the corresponding bank that is to be retired (and dequeued, or evicted, from the load queue). A resolved pointer associated with a given bank may indicated the oldest entry in that bank for which a virtual-to-physical address translation has not yet been performed.

An embodiment of a load-store unit having a banked store queue is also contemplated. Each of two or more banks of the banked store queue may include a number of entries arranged to store a contiguous set of store instructions. Store instructions may be retired and dequeued, in order from one of the banks. Following completion of the retirement of the instructions in one bank, store instructions may be retired and dequeued, in order from the next bank. Pointer logic associated with the banks may exchange information indicating which of the banks is the older (in terms of the entries stored therein) at any given time.

BRIEF DESCRIPTION OF THE DRAWINGS

The following detailed description makes reference to the accompanying drawings, which are now briefly described.

Although the embodiments disclosed herein are susceptible to various modifications and alternative forms, specific embodiments are shown by way of example in the drawings and are described herein in detail. It should be understood, however, that drawings and detailed description thereto are not intended to limit the scope of the claims to the particular forms disclosed. On the contrary, this application is intended to cover all modifications, equivalents and alternatives falling within the spirit and scope of the disclosure of the present application as defined by the appended claims.

This disclosure includes references to "one embodiment," "a particular embodiment," "some embodiments," "various embodiments," or "an embodiment." The appearances of the phrases "in one embodiment," "in a particular embodiment," "in some embodiments," "in various embodiments," or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. An "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

In the following description, numerous specific details are set forth to provide a thorough understanding of the disclosed embodiments. One having ordinary skill in the art, however, should recognize that aspects of disclosed embodiments might be practiced without these specific details. In some instances, well-known circuits, structures, signals, computer program instruction, and techniques have not been shown in detail to avoid obscuring the disclosed embodiments.

DETAILED DESCRIPTION OF EMBODIMENTS

Figure 1:
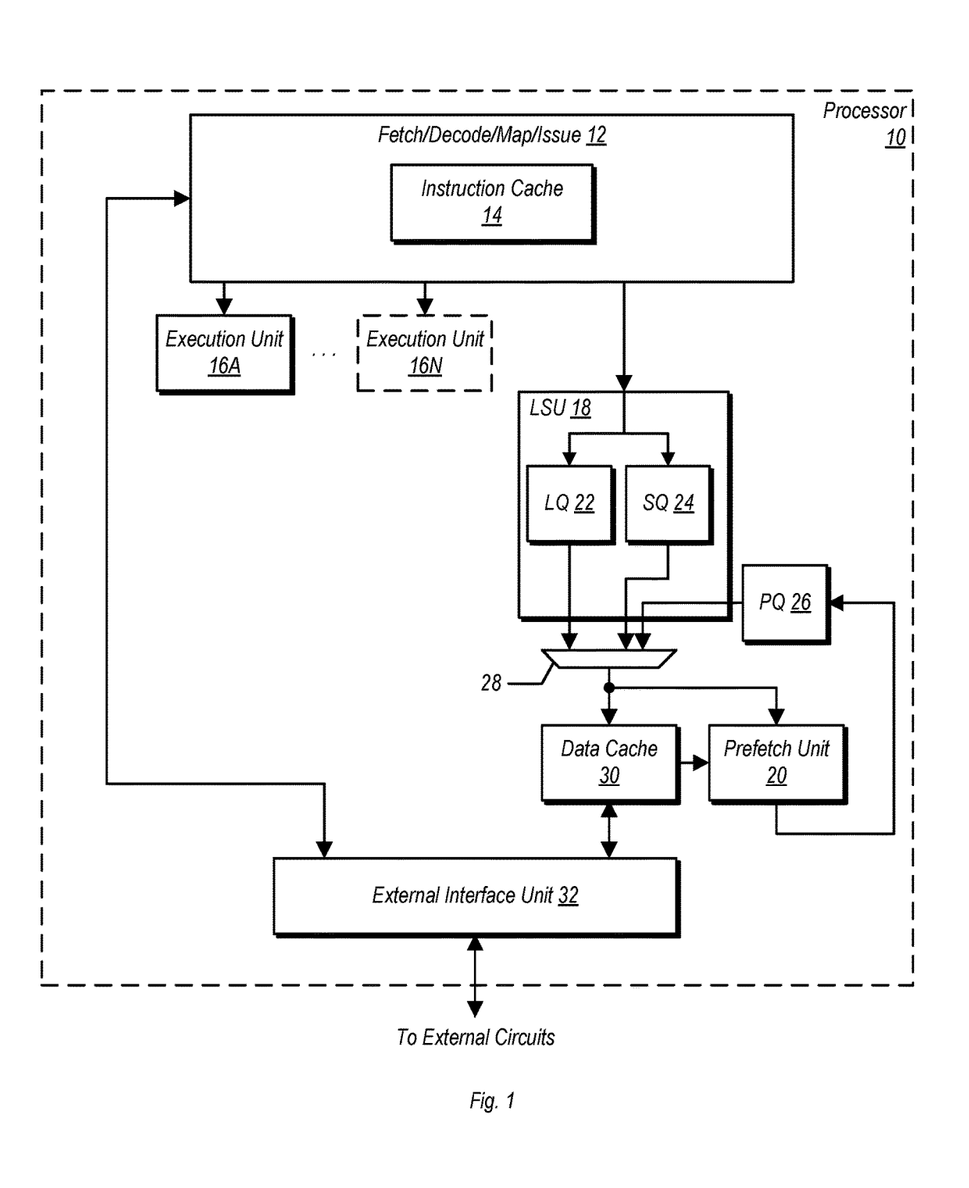
FIG. 1 is a block diagram of one embodiment of an exemplary processor having a load-store unit.

Turning now to FIG. 1, a block diagram of one embodiment of a processor 10 is shown. In the embodiment of FIG. 1, the processor 10 may include a fetch/decode/map/issue (FDMI) unit 12 that may include an instruction cache 14. The processor 10 may further include one or more execution units 16A-16N, a load/store unit (LSU) 18, a prefetch unit 20, a load queue (LQ) 22, a store queue (SQ) 24, a prefetch queue (PQ) 26, a multiplexor (mux) 28, a data cache 30, and an external interface unit 32. The data cache 30 and the FDMI unit 12 are coupled to the external interface unit 32, which is coupled to communicate external to the processor 10 (e.g. to a level 2 (L2) cache and/or to other components of a system including the processor 10). The FDMI unit 12 is coupled to the execution units 16A-16N and the LSU 18. The LSU 18 includes a load queue 22 and the store queue 24, and is coupled to the prefetch unit 20 is coupled to the data cache 30 and the prefetch queue 26. The LSU 18, including the load queue 22, the store queue 24, and the prefetch queue 26 are coupled to the mux 28, which is coupled to the data cache 30 and the prefetch unit 20.

The FDMI unit 12 may be configured to fetch instructions for execution by the processor 10, decode the instructions into ops for execution, map the ops to speculative resources (e.g. rename registers) to permit out-of-order and/or speculative execution, and issue the ops for execution to the execution units 16A-16N and/or LSU 18. More particularly, the FDMI unit 12 may be configured to cache instructions previously fetched from memory (through the external interface unit 32) in the instruction cache 14, and may be configured to speculatively fetch a speculative path of instructions for the processor 10. The FDMI unit 12 may implement various prediction structures to predict the fetch path. For example, a next fetch predictor may be used to predict fetch addresses based on previously executed instructions. Branch predictors of various types may be used to verify the next fetch prediction, or may be used to predict next fetch addresses if the next fetch predictor is not used. The FDMI unit 12 may be configured to decode the instructions into instruction operations. In some embodiments, a given instruction may be decoded into one or more instruction operations, depending on the complexity of the instruction. Particularly complex instructions may be microcoded, in some embodiments. In such embodiments, the microcode routine for the instruction may be coded in instruction operations. In other embodiments, each instruction in the instruction set architecture implemented by the processor 10 may be decoded into a single instruction operation, and thus the instruction operation may be essentially synonymous with instruction (although it may be modified in form by the decoder). The term "instruction operation" may be more briefly referred to herein as "op." The ops may be mapped to physical registers from the architectural registers used in the instructions, and then scheduled for issue. The scheduling may be centralized in a scheduler, or decentralized in reservation stations, in various embodiments, based on the availability of operands for each op. A register file or files (not shown in FIG. 1) may implement the physical registers of the processor 10. There may be separate physical registers for different operand types (e.g. integer, media, floating point, etc.) in an embodiment. In other embodiments, the physical registers may be shared over operand types.

The execution units 16A-16N may include any types of execution units in various embodiments. For example the execution units 16A-16N may include integer, floating point, and/or media execution units. Integer execution units may be configured to execute integer ops. Generally, an integer op is an op which performs a defined operation (e.g. arithmetic, logical, shift/rotate, etc.) on integer operands. Integers may be numeric values in which each value corresponds to a mathematical integer. The integer execution units may include branch processing hardware to process branch ops, or there may be separate branch execution units.

Floating point execution units may be configured to execute floating point ops. Generally, floating point ops may be ops that have been defined to operate on floating point operands. A floating point operand is an operand that is represented as a base raised to an exponent power and multiplied by a mantissa (or significand). The exponent, the sign of the operand, and the mantissa/significand may be represented explicitly in the operand and the base may be implicit (e.g. base 2, in an embodiment).

Media execution units may be configured to execute media ops. Media ops may be ops that have been defined to process media data (e.g. image data such as pixels, audio data, etc.). Media processing may be characterized by performing the same processing on significant amounts of data, where each datum is a relatively small value (e.g. 8 bits, or 16 bits, compared to 32 bits to 64 bits for an integer). Thus, media ops often include single instruction-multiple data (SIMD) or vector operations on an operand that represents multiple media data.

Thus, each execution unit may comprise hardware configured to perform the operations defined for the ops that the particular execution unit is defined to handle. The execution units may generally be independent of each other, in the sense that each execution unit may be configured to operate on an op that was issued to that execution unit without dependence on other execution units. Viewed in another way, each execution unit may be an independent pipe for executing ops.

LSU 18 may be configured to execute load/store ops. Generally, a load op may specify a transfer of data from a memory location to a register, while a store op may specify a transfer of data from a register to a memory location. LSU 18 may also be configured to perform virtual address generation from various address operands of the load/store ops and may be configured to transmit the ops to the data cache 30 (through the mux 28) and to the load queue 22/store queue 24.

The load queue 22 may be configured to queue loads that have been executed by the LSU 18. The loads may be queued awaiting cache fills if they miss in the data cache 30 (and/or TLB miss translation fills if translation is enabled). The loads may be queued for ordering reasons as well. Similarly, the store queue 24 may be configured to queue stores that have been executed by the LSU 18. The stores may be queue for cache/TLB fills, to await store data from the data source operand, and/or to await non-speculative/retired state to update the data cache 30 and/or memory. In other embodiments, a combined load/store queue may be used.

The prefetch queue 26 may store prefetch requests generated by the prefetch unit 20 to access the data cache 30. The prefetch requests may be generated by the prefetch unit 20 observing the load/store ops executed by LSU 18. Thus, the prefetch requests may be predicted read requests generated prior to the instruction code being executed by the processor 10 actually requesting the data. In contrast, cache requests by load/store ops may be referred to as demand fetches, because they are directly specified by the execution of code, rather than predicted.

In an embodiment, the prefetch unit 20 may be an implementation of an AMPM prefetcher with various enhancements. The prefetch unit 20 may monitor the demand fetches/prefetch requests selected through the mux 28 to access the data cache 30, along with cache hit/miss status from the data cache 30, to generate prefetch requests.

The data cache 30 may have any capacity and configuration. For example, set associative, fully associative, and direct mapped configurations may be used in various embodiments. The data cache 30 may be configured to cache data in cache blocks, where a cache block is a set of bytes from contiguous memory locations that are allocated and deallocated space in the cache as a unit. The cache blocks may be aligned to a cache block boundary (e.g. a 32 byte cache block may be aligned to a 32 byte boundary, a 64 byte cache block may be aligned to a 64 byte boundary, etc.). Thus, the address of a byte may be divided into a cache offset portion (the least N significant bits of the address, where $2^N$ is the size of the cache block) and a cache tag portion (the remaining address bits). In an embodiment, the data cache 30 may be virtually indexed and a translation lookaside buffer (TLB, not shown in FIG. 1) may be accessed in parallel to translate the virtual address to a physical address of a memory location in the memory.

Cache misses in data cache 30 and instruction cache 14, as well as translation accesses, non-cacheable accesses, etc. may be communicated to the external interface unit 32. The external interface unit 32 may be configured to transmit transactions to the external components in response to the various accesses generated in the processor 10. The external interface on which transactions are transmitted may have any form. For example, the external interface may be a shared bus, a point to point interconnect with packetized transactions, a full or partial crossbar, etc.

The mux 28 may select among its various inputs (the load queue 22, the store queue 24, and the prefetch queue 26 in this example) to transmit cache accesses to the data cache 30. Control logic to the mux 28 (not shown in FIG. 1) may arbitrate among the requests using any desired arbitration scheme.

It is noted that any number and type of execution units 16A-16N may be included in various embodiments, including embodiments having one execution unit and embodiments having multiple execution units. Any number of LSUs 18 may be included in various embodiments as well, including the one LSU 18 showed in this embodiment and embodiments having multiple LSUs. Additionally embodiments that include load units (that execute only load ops) and/or store units (that execute only store ops) may be included with or without LSUs.

Figure 2:
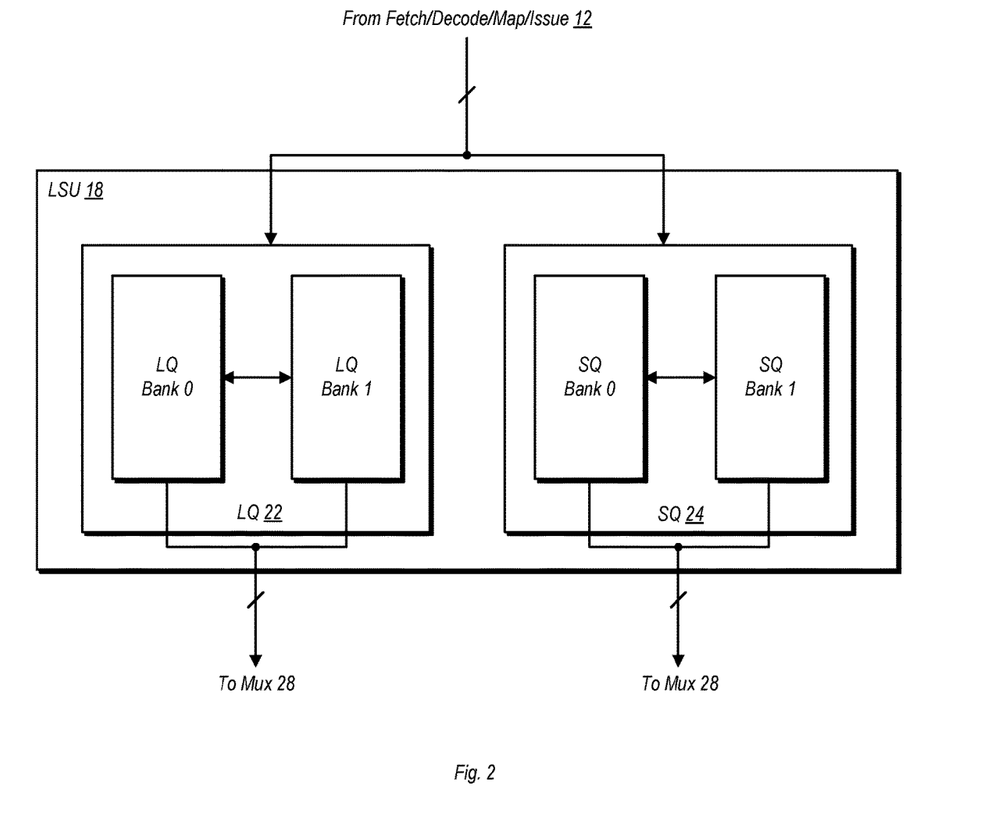
FIG. 2 is a block diagram of one embodiment of a load-store unit having banked load and store queues.

FIG. 2 is a block diagram illustrating one embodiment of a LSU having banked load and store queues. In the embodiment shown, LSU 18 includes a load queue 22 having two different banks, and a store queue, also having two separate banks. Each of the load queue 22 and the store queue 24 are coupled to receive load and store instructions, respectively, issued by FDMI unit 12. These instructions may be stored in entries of their corresponding queues, and may be executed by other circuitry (not shown) within LSU 18. As will be discussed below, the entries of the separate banks of load queue 22 may be interleaved with one another. Conversely, each bank of store queue 24 may store contiguous groups of store instructions (in terms of retirement order). Each of the load queue 22 and store queue 24 as shown in FIG. 2 may output selected entries to mux 28 as shown in FIG. 1.

It is noted that while the embodiment shown in FIG. 2 includes two banks for each of the load and store queues, the disclosure is not limited in such a manner. On the contrary, the number of banks in a given embodiment of a load and/or store queue may include any number of banks. Furthermore, it is not required that banked embodiments of load and store queues have an equal number of banks, or equal sized banks with respect to each other.

Figure 3:
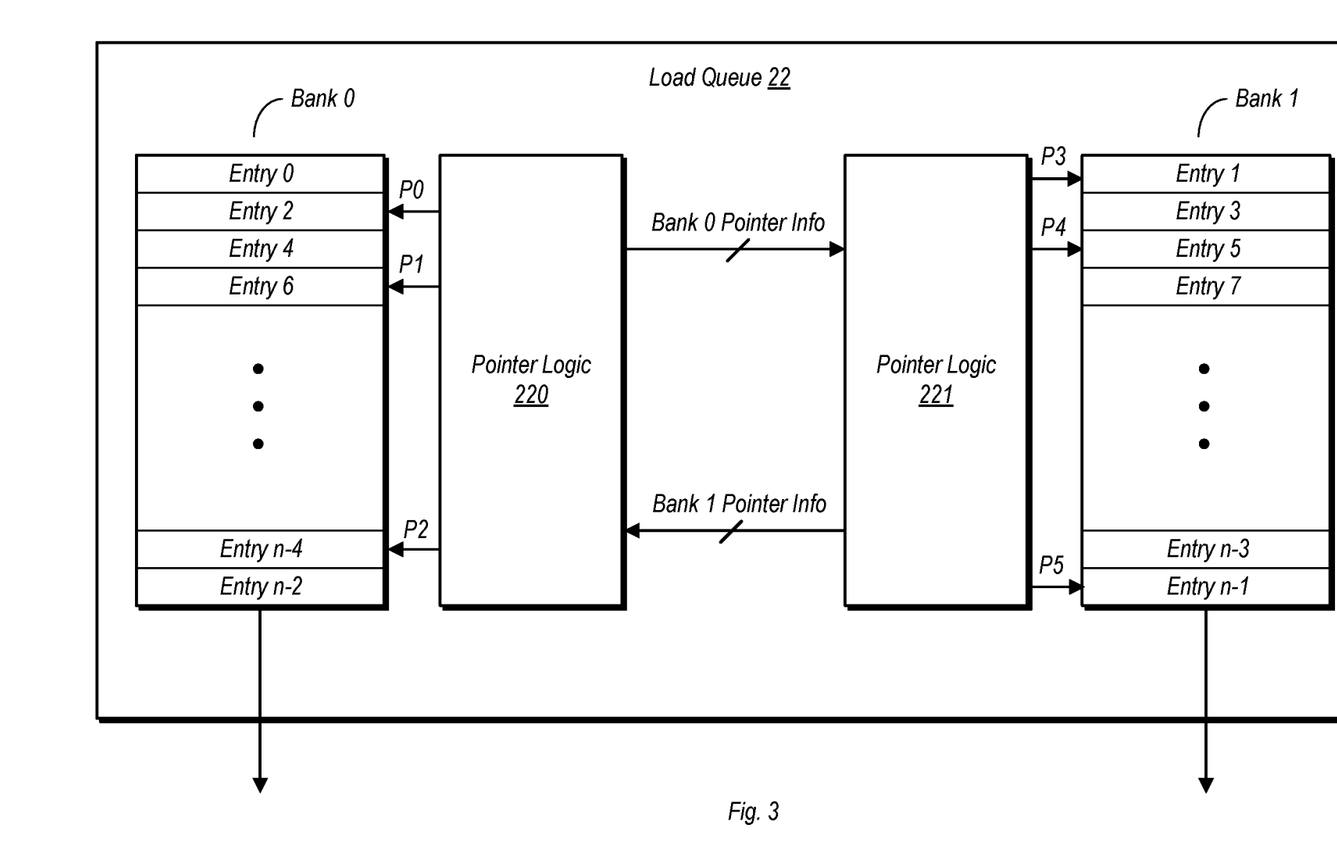
FIG. 3 is a block diagram illustrating one embodiment of a banked load queue and corresponding logic.

FIG. 3 is a block diagram illustrating one embodiment of a banked load queue and corresponding logic. In the embodiment shown, Load Queue 22 includes two banks, Bank 0 and Bank 1. The entries of these banks are interleaved, with even numbered entries being stored in Bank 0 and odd numbered entries being stored in Bank 1. Accordingly, as new entries are stored in the banks, they may be stored in alternating fashion (i.e. an entry is stored in Bank 0, the next entry in Bank 1, the entry after that in Bank 0, and so on). Each of the entries may store a load instruction that is to be or has already been executed by LSU 18.

Bank 0 is coupled to a first pointer logic unit 220, while Bank 1 is coupled to a second pointer logic unit 221. Each of the pointer logic units implement circuitry that controls the position of various pointers to their respective banks. Additionally pointer logic 220 and pointer logic 221 may exchange pointer information with each other. Each of pointer logic units 220 and 221 may use information regarding its own pointers as well as that received from each other to determine which entries are eligible for retirement, as well as other operations that may be performed. Each of pointer logic units 220 and 221 may select, during each cycle of operation, an entry or entries that are to be dequeued. In one embodiment, each of the pointer logic units 220 and 221 may select one entry from their respectively coupled bank for retirement. However, it is noted that exceptions are possible even in such embodiments due to various conditions, such as ordering requirements.

In the embodiment shown, pointer logic 220 controls pointers P0, P1, and P2, while pointer logic 221 controls pointers P3, P4, and P5. The different pointers may indicated different information about the entry to which they are currently pointing, as well as other entries within the queues. In this embodiment, the pointers include a resolved pointer, a dequeue pointer, and a retirement eligibility pointer.

The resolve pointer may indicate, for a respective bank, an oldest entry for which a virtual-to-physical address translation has not been performed. Prior to executing a corresponding load instruction, a virtual-to-physical address translation is performed. Accordingly, Load Queue 22 may initiate accesses to a translation lookaside buffer (TLB) or page table based on the position of the resolved pointers for each of the banks in Load Queue 22.

The retirement eligibility pointer for each of the banks may be used to indicate which entries therein are eligible for retirement (i.e. their corresponding load instructions have been executed). In one embodiment, the retirement eligibility pointer for a given bank may point to the oldest entry that does not meet eligibility for retirement. Thus, all entries in that bank that are older than the entry indicated by the retirement eligibility pointer may be considered eligible for retirement.

The dequeued pointer for each of the banks may indicate which entry therein is the next entry to be dequeued (i.e. evicted from the queue). Accordingly, the dequeue pointer in each bank may point to one of the entries indicated as being retirement eligible by the corresponding retirement eligibility pointer. It is noted, however, that the entry indicated by the dequeue pointer does not necessarily need to be the oldest retirement eligible entry in that bank. On the hand, being selected by the dequeue pointer in this embodiment indicates that the entry is older than the entries indicated by the retirement eligibility pointer for its own bank as well as for other banks. For example, in the example of FIG. 3, the dequeue pointer for Bank 0 may point to an entry therein that is older than the retirement eligibility pointer for its own bank as well as being older than the retirement eligibility pointer associated with Bank 1.

Pointer logic units 220 and 221 may also perform functions to prevent ordering violations when retiring instructions. For example, if two different loads have the same address, the pointer logic units 220 and 221 may ensure that these instructions are retired/dequeued in order.

It is noted that while the load queue as shown herein is divided into separate banks, this division is not visible to software (e.g., operating system software). On the contrary, software views the load queue as a single logical entity for the various embodiments contemplated herein, irrespective of the number of banks in the load queue. Various embodiments of a multi-banked store queue, as discussed below, are also viewed by software as a single logical entity.

Figure 4:
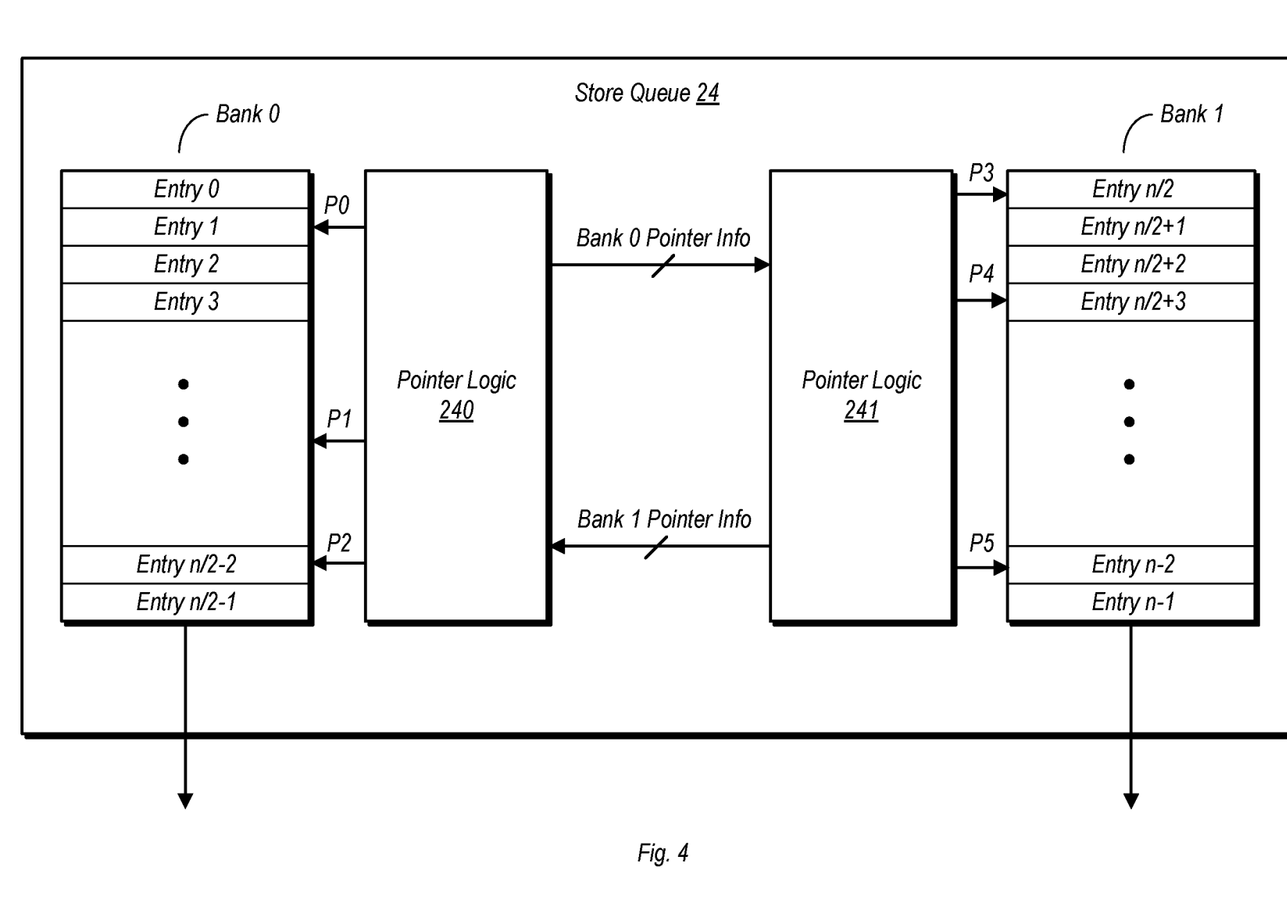
FIG. 4 is a block diagram illustrating one embodiment of a banked store queue and corresponding logic.

FIG. 4 is a block diagram illustrating one embodiment of a banked store queue and corresponding logic. In the embodiment shown, store queue 24 includes two banks, Bank 0 and Bank 1, although embodiments with a greater number of banks (e.g., 4) are possible and contemplated. Each bank may include a number of entries each of which is arranged to store a store instruction. The total number of entries for store queue is an integer value, n. Bank 0 in this embodiment includes entries 0 to n/2-1, while Bank 1 includes entries n/2 to n-1.

Unlike the embodiment of load queue 22 discussed above, in which the entries are interleaved, the entries in the respective banks are not interleaved. Instead, each bank stores a contiguous group of store instructions that are retired and dequeued from their respective bank in a predetermined order. During operation, the group of store instructions in one of the banks are dequeued fully before proceeding to retire any of the store instructions in the other bank. Furthermore, while store instructions are being dequeued from one of the banks, the other bank may concurrently be filled with store instructions. By retiring store instructions in contiguous groups, information may be written back to memory in a correct program order.

Store queue 24 in the embodiment shown includes two pointer logic units, pointer logic unit 240 and pointer logic unit 241. Similar to their counterparts in the embodiment of load queue 22 discussed above, the pointer logic units 240 and 241 implement circuitry that controls the position of the pointers of their respectively coupled bank. Furthermore, pointer logic units 240 and 241 are arranged to exchange pointer information with one another.

In this particular embodiment, each pointer logic unit controls the position of three pointers. One of the pointers may be a dequeue pointer, which indicates the next entry to be dequeued in a given bank. Another pointer may be a resolve pointer indicative of which entries within its respective queue for which a virtual-to-physical address translation has not been performed. A third pointer may point to an oldest entry in a bank. The pointer logic units 240 and 241 may also exchange information, either via the pointers or other sources, indicating when they have completely dequeued a contiguous group of store instructions stored therein, thereby letting the other pointer logic unit know that it can begin retiring its currently stored group. For example, the information indicated by third pointers of pointer logic units 240 and 241 may be exchanges such that each pointer logic unit knows which of the two has the oldest set of entries.

Figure 5:
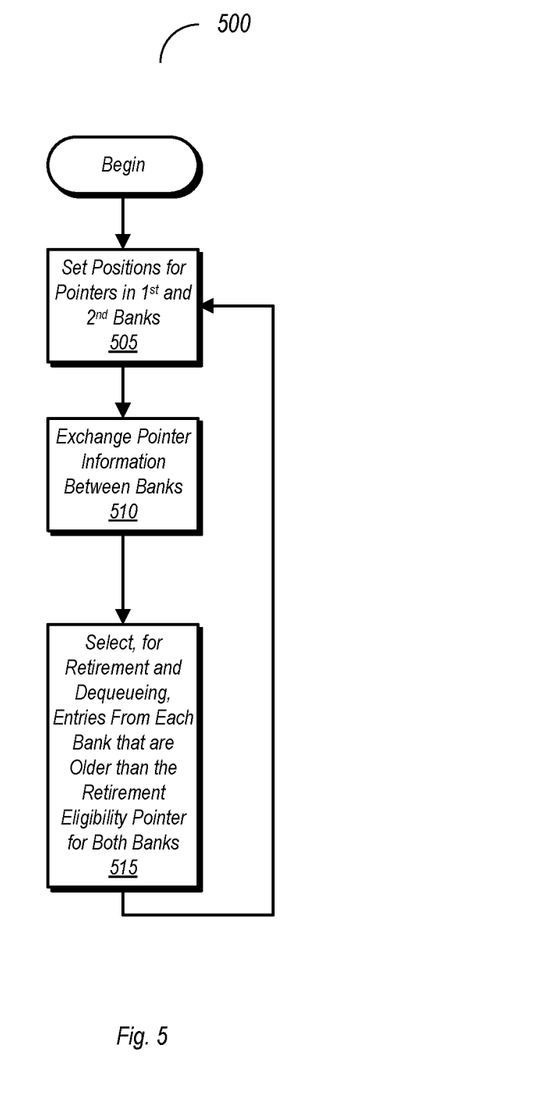
FIG. 5 is a flow diagram illustrating operation of one embodiment of a banked load queue.

FIG. 5 is a flow diagram illustrating operation of one embodiment of a banked load queue. Method 500 as shown herein may be performed with any of the various hardware embodiments discussed above. It is also possible that method 500 could be performed with hardware embodiments not explicitly discussed herein. Furthermore, while it is noted that method 500 is discussed herein in reference to a load queue having two banks, embodiments of the method covering any number of banks in a load queue that is a single logical entity are possible and contemplated.

Method 500 begins with the setting of positions for pointers in first and second banks of a banked load queue (block 505). The pointers may include those discussed above, such as a resolve pointer, a retirement eligibility pointer, and a dequeue pointer. The pointers may be set at their respective positions for a given cycle based on the status of various entries. For example, the resolve pointer may be set to the oldest entry for which no address translation has been performed.

Pointer information is also exchanged between the banks, specifically between logic circuitry (e.g., pointer logic units) associated with the banks (block 510). The exchanged pointer information may be used by each pointer logic unit to determine entries that can be dequeued or are eligible for retirement. For example, a retirement eligibility pointer for a given bank may indicate that a certain entry is eligible for retirement. However, the entry may not be older than the entry indicated by the dequeue pointer of the other bank. Accordingly, the entry may not be selected for retirement on the current cycle. Thus, during each cycle, an entry may be selected from each bank that is older than the retirement eligibility pointer for both banks (block 515), or al banks in embodiments having more than two banks.

Figure 6:
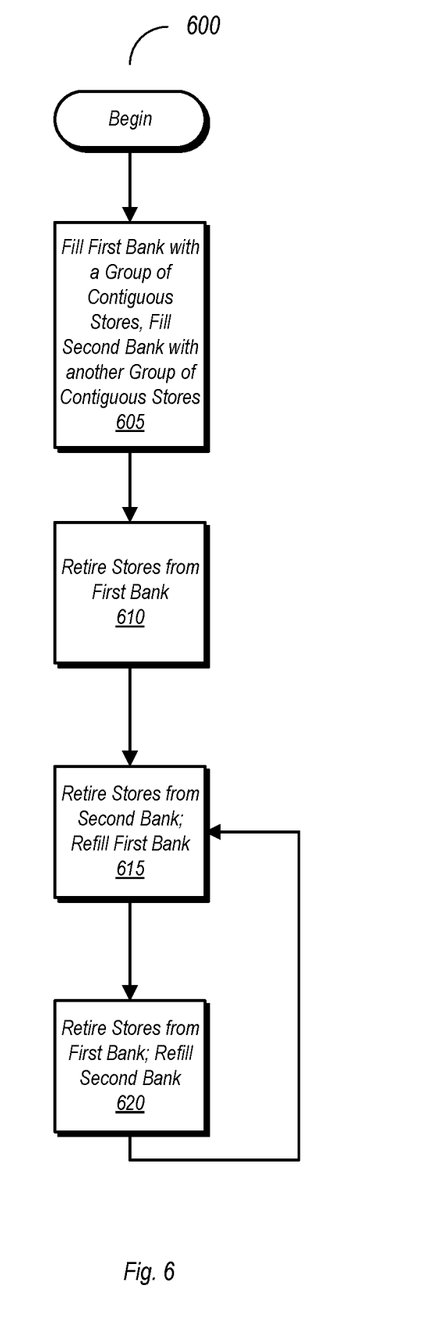
FIG. 6 is a flow diagram illustrating operation of one embodiment of a banked store queue.

FIG. 6 is a flow diagram illustrating operation of one embodiment of a banked store queue. Method 600 as discussed herein may be performed with any of the hardware embodiments discussed above and/or contemplated herein, including embodiments having more than two banks in the store queue. It is also possible that hardware embodiments not explicitly discussed herein may perform method 600.

Method 600 begins with first and second banks of a store queue being filled with respective groups of contiguous stores (block 605). As the store instructions are executed, they may be dequeued, in order, from the first bank (block 610). After all the stores have been dequeued from the first bank, the stores from the second bank may be dequeued, in order (block 615). During the retirement of store instructions from the second bank, the first bank may be refilled with incoming store instructions. It is noted that store instructions from both may in some cases (e.g., when there are no address conflicts) may be concurrent executed.

After completing the retirement of the stores in the second bank, stores from the first bank may once again be retired, in order, while refilling the second bank (block 620). Thereafter, method may cycle between blocks 615 and 620, retiring stores in order from one bank while refilling the other bank.

The various method and apparatus embodiments described herein may provide certain advantages over prior art embodiments. By utilizing multiple banks in a load and/or store queue, larger queues may be enabled while having less impact on timing requirements. In prior art embodiments, the size of a load and/or store queue may be limited due to timing, whereas the banked queues discussed herein may circumvent these limits to some degree.

In some prior art embodiments, multiple load/store units are used. However, this solution may be less efficient than the banked load and store queues discussed herein. The multiple load/store units may require a greater amount of circuit area than a single load/store unit with banked queues. Furthermore, multiple load/store units are seen by software as logically different entities, as opposed to the banked embodiments discussed herein, which are seen as single logical entities. Thus, the single logical entity may be easier to manage.

Figure 7:
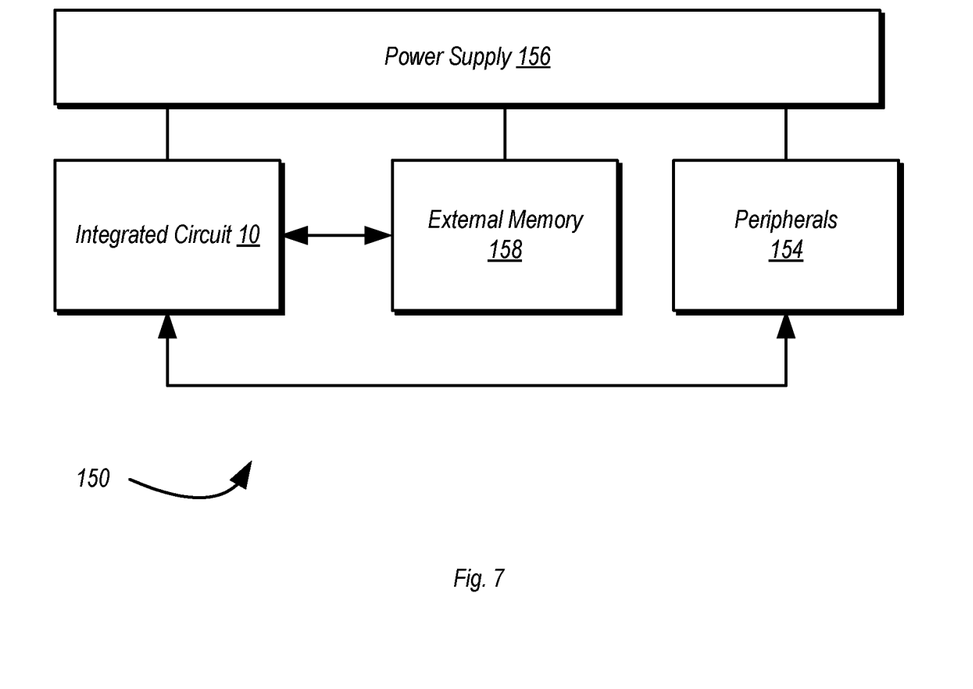
FIG. 7 is a block diagram of one embodiment of an exemplary system.

Turning next to FIG. 7, a block diagram of one embodiment of a system 150 is shown. In the illustrated embodiment, the system 150 includes at least one instance of an integrated circuit 10 coupled to external memory 158. The integrated circuit 10 may include a memory controller that is coupled to the external memory 158. The integrated circuit 10 is coupled to one or more peripherals 154 and the external memory 158. A power supply 156 is also provided which supplies the supply voltages to the integrated circuit 10 as well as one or more supply voltages to the memory 158 and/or the peripherals 154. In some embodiments, more than one instance of the integrated circuit 10 may be included (and more than one external memory 158 may be included as well). Integrated circuit 10 may implement any or all of the circuitry discussed above, in any of the various embodiments possible and contemplated herein.

The peripherals 154 may include any desired circuitry, depending on the type of system 150. For example, in one embodiment, the system 150 may be a mobile device (e.g. personal digital assistant (PDA), smart phone, etc.) and the peripherals 154 may include devices for various types of wireless communication, such as WiFi, Bluetooth, cellular, global positioning system, etc. The peripherals 154 may also include additional storage, including RAM storage, solid-state storage, or disk storage. The peripherals 154 may include user interface devices such as a display screen, including touch display screens or multitouch display screens, keyboard or other input devices, microphones, speakers, etc. In other embodiments, the system 150 may be any type of computing system (e.g. desktop personal computer, laptop, workstation, tablet, etc.).

The external memory 158 may include any type of memory. For example, the external memory 158 may be SRAM, dynamic RAM (DRAM) such as synchronous DRAM (SDRAM), double data rate (DDR, DDR2, DDR3, LPDDR1, LPDDR2, etc.) SDRAM, RAMBUS DRAM, etc. The external memory 158 may include one or more memory modules to which the memory devices are mounted, such as single inline memory modules (SIMMs), dual inline memory modules (DIMMs), etc.

Numerous variations and modifications will become apparent to those skilled in the art once the above disclosure is fully appreciated. It is intended that the following claims be interpreted to embrace all such variations and modifications.

The invention claimed is:

1. A processor comprising:
   a load-store unit configured to load data from a memory subsystem and further configured to store data back to the memory subsystem, wherein the load-store unit includes:
      a first queue, wherein the first queue includes a first bank and a second bank having first and second pluralities of entries, respectively, each entry of the first and second pluralities of entries being configured to store memory instructions, wherein the first queue is logically a single queue, and wherein each of the first and second banks includes one or more pointers each dedicated to that bank; and first pointer logic, wherein during each cycle of operation the first pointer logic is configured to select for de-queueing at least one of the entries of the first plurality of entries or the second plurality of entries based at least on respective positions of the pointers dedicated to the first and second banks, wherein the first pointer logic is configured to control first and second resolved pointers associated with the first and second banks, respectively, the first and second resolved pointers indicating oldest entries in their respective one of the first and second banks for which no virtual-to-physical address translation has been resolved.

2. The processor as recited in claim 1, wherein the first queue is a load queue, wherein each of the first and second plurality of entries are directed to load instructions, and wherein entries of the first bank are interleaved with entries of the second bank.

3. The processor as recited in claim 2, wherein the load-store unit further includes a second queue that is a store queue, wherein the second queue includes third and fourth banks having third and fourth pluralities of entries, respectively, each of the third and fourth plurality of entries being directed to store instructions, wherein the second queue is logically a single queue, wherein each of the third and fourth banks include at least one pointer dedicated to that bank.

4. The processor as recited in claim 3, further comprising second pointer logic, wherein during each cycle of operation the second pointer logic is configured to select for de-queueing one of the entries of the third plurality of entries or the fourth plurality of entries based at least on relative positions of the pointers dedicated to the third and fourth banks.

5. The processor as recited in claim 3, wherein the third plurality of entries is a first group of contiguous store entries, and wherein the fourth plurality of entries is a second group of contiguous store entries.

6. The processor as recited in claim 1, further comprising a first dequeue pointer associated with the first bank and a second dequeue pointer associated with the second bank, wherein the first dequeue pointer is indicative of a next one of the first plurality of entries to be retired and dequeued from the first bank, and wherein the second dequeue pointer is indicative of a next one of the second plurality of entries to be retired and dequeued from the second bank.

7. The processor as recited in claim 1, further comprising a first retirement eligibility pointer associated with the first bank and a second retirement eligibility pointer associated with the second bank, wherein the first retirement eligibility pointer is indicative of entries within the first plurality of entries that are eligible for retirement and, and wherein the second retirement eligibility pointer is indicative of entries within the second plurality of entries that are eligible for retirement.

8. The processor as recited in claim 1, wherein the first pointer logic includes:
a first logic unit associated with the first bank, wherein the first logic unit is configured to control respective positions of each of the one or more pointers dedicated to the first bank; and a second logic unit associated with the second bank, wherein the second logic unit is configured to control respective positions of each of the one or more pointers dedicated to the second bank.

9. The processor as recited in claim 8, wherein the first logic unit is configured to convey, to the second logic unit, each of the one or more pointers dedicated to the first bank, and wherein the second logic unit is configured to convey, to the first logic unit, each of the one or more pointers dedicated to the second bank.

10. A method comprising:
setting, using a first logic circuit, respective positions for one or more pointers of a first bank of a first queue in a load-store unit, wherein the first queue includes first and second banks having first and second pluralities of entries, respectively, wherein setting using the first logic circuit includes the first logic circuit using a first resolved pointer to indicate an oldest one of the first plurality of entries for which an address translation has not been resolved;

setting, using a second logic circuit, respective positions for one or more pointers of the second bank, wherein setting using the second logic circuit includes the second logic circuit using a second resolved pointer to indicate an oldest one of the second plurality of entries for which an address translation has not been resolved;

conveying, using the first logic circuit, respective pointer positions for the one or more pointers of the first bank to the second logic circuit;

conveying, using the second logic circuit, respective pointer positions for the one or more pointers of the second bank to the first logic circuit; and selecting, during each cycle of operation, an entry from the first and second pluralities of entries, respectively, to be dequeued, wherein selecting is performed by the first and second logic circuits.

11. The method as recited in claim 10, further comprising:
the first logic circuit indicating which ones of the first plurality of entries are eligible for retirement using a first retirement eligibility pointer;

the second logic circuit indicating which ones of the second plurality of entries are eligible for retirement using a second retirement eligibility pointer;

during a given cycle of operation, the first and second logic circuits selecting respective entries from the first and second pluralities of entries for retirement, wherein entries selected from retirement are older than entries indicated by both of the first and second retirement eligibility pointers.

12. The method as recited in claim 10, further comprising:
the first logic circuit using a first dequeue pointer to indicate an oldest one of the first plurality of entries that has not yet been retired; and the second logic circuit using a second dequeue pointer to indicate an oldest one of the second plurality of entries that has not been retired.

13. An integrated circuit comprising:
a load-store unit implemented in a processor core, wherein the load-store unit is configured to execute loads of information from a memory into the processor and further configured to execute stores of information from the processor to the memory, wherein load-store unit includes a load queue configured to store load instruction, the load queue including:
a first bank having a first plurality of entries;
a first logic circuit configured to control one or more pointers associated with the first bank;

a second bank having a second plurality of entries; and a second logic unit configured to control one or more pointers associated with the second bank, wherein the first and second logic units are configured to exchange information regarding their respective pointers;

wherein, during each cycle of operation, the first and second logic units are configured to select a respective entry from the first and second logic units for retirement based on positions of each of the one or more pointers associated with the first and second banks, wherein each of the first and second logic units is configured to control respective resolve pointers indicating oldest entries in their respective one of the first and second banks for which no address translation has been performed.

14. The integrated circuit as recited in claim 13, wherein each of the first and second logic units is configured to control respective first and second dequeue pointers indicating a next entry to be retired and dequeued from their respective ones of the first and second banks.

15. The integrated circuit as recited in claim 14, wherein each of the first and second logic units is configured to control respective first and second eligibility pointers indicating respective entries that are eligible for retirement in the respective ones of the first and second banks, wherein the first and second logic units are configured to select for retirement from their respective one of the first and second plurality of entries, entries that are older than entries indicated by both of the first and second eligibility pointers.

16. The integrated circuit as recited in claim 13, wherein entries of the first and second pluralities of entries are interleaved with one another.

17. The integrated circuit as recited in claim 13, wherein the load-store unit further includes a store queue having a third bank configured to store a third plurality of entries and a fourth bank configured to store a fourth plurality of entries, wherein the third plurality of entries are contiguous stores and wherein the fourth plurality of entries are contiguous stores, wherein the load-store unit is configured to consecutively execute and retire all of the contiguous stores of the third plurality of entries and subsequently execute, consecutively, all of the contiguous stores of the fourth plurality of entries.

* * * * *